United States Patent
Greenwood et al.

(10) Patent No.: US 10,721,181 B1
(45) Date of Patent: Jul. 21, 2020

(54) NETWORK LOCALITY-BASED THROTTLING FOR AUTOMATED RESOURCE MIGRATION

(71) Applicant: Amazon Technologies, Inc., Seattle, WA (US)

(72) Inventors: Christopher Magee Greenwood, Seattle, WA (US); Surya Prakash Dhoolam, Seattle, WA (US); Marc John Brooker, Seattle, WA (US); Mitchell Gannon Flaherty, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 640 days.

(21) Appl. No.: 14/643,906

(22) Filed: Mar. 10, 2015

(51) Int. Cl.
*H04L 12/911* (2013.01)
*H04L 12/26* (2006.01)

(52) U.S. Cl.
CPC ........ *H04L 47/783* (2013.01); *H04L 43/0876* (2013.01)

(58) Field of Classification Search
CPC .................. H04L 47/783; H04L 43/0876
USPC ....................................................... 709/224
See application file for complete search history.

(56) References Cited

U.S. PATENT DOCUMENTS

| | | | |
|---|---|---|---|
| 6,922,724 B1 | 7/2005 | Freeman et al. | |
| 7,165,088 B2 | 1/2007 | Barker et al. | |
| 8,095,929 B1 * | 1/2012 | Ji | G06F 9/4856 709/223 |
| 8,230,069 B2 | 7/2012 | Korupolu | |
| 8,321,862 B2 | 11/2012 | Swamy et al. | |
| 8,438,263 B2 * | 5/2013 | Sivasubramanian | ... H04L 67/06 709/203 |
| 8,442,955 B2 * | 5/2013 | Al Kiswany | ..... G06F 17/30233 707/610 |
| 8,452,819 B1 * | 5/2013 | Sorenson, III | ........ G06F 3/0611 707/809 |

(Continued)

FOREIGN PATENT DOCUMENTS

| | | |
|---|---|---|
| JP | 2009140356 | 6/2009 |
| JP | 2013152553 | 8/2013 |

(Continued)

OTHER PUBLICATIONS

U.S. Appl. No. 13/053,469, filed Mar. 22, 2011, James Christopher Sorenson, et al.

(Continued)

*Primary Examiner* — Nicholas R Taylor
*Assistant Examiner* — Chong G Kim
(74) *Attorney, Agent, or Firm* — Robert C. Kowert; Kowert, Hood, Munyon, Rankin & Goetzel, P.C.

(57) ABSTRACT

A distributed system may implement network locality-based throttling for automatic resource migration. Utilization of a distributed system that includes multiple resources at multiple resource hosts may be monitored. New migration operations to migrate a resource in the distributed system may be evaluated with respect a migration operation limit for one or more network localities of the distributed system. If the migration operation limit for the one or more network localities is exceeded, then the new migration operations may be throttled. Different network localities may have different migration operation limits.

20 Claims, 9 Drawing Sheets

(56) References Cited

U.S. PATENT DOCUMENTS

| | | | |
|---|---|---|---|
| 8,452,856 B1* | 5/2013 | Lent | G06F 3/0647 709/219 |
| 8,615,579 B1* | 12/2013 | Vincent | G06F 9/4856 709/223 |
| 8,667,494 B1* | 3/2014 | Riordan | G06F 9/5011 718/104 |
| 8,738,972 B1 | 5/2014 | Bakman et al. | |
| 8,880,477 B2 | 11/2014 | Barker et al. | |
| 8,924,539 B2 | 12/2014 | Ferris et al. | |
| 9,020,984 B1* | 4/2015 | Sorenson, III | G06F 3/0611 707/809 |
| 2005/0228878 A1 | 10/2005 | Anstey et al. | |
| 2006/0233108 A1* | 10/2006 | Krishnan | H04J 3/1682 370/235 |
| 2008/0052026 A1 | 2/2008 | Amidon et al. | |
| 2008/0059536 A1 | 3/2008 | Brock et al. | |
| 2008/0216086 A1* | 9/2008 | Tanaka | G06F 3/061 718/105 |
| 2008/0271039 A1 | 10/2008 | Rolia et al. | |
| 2008/0301763 A1* | 12/2008 | Sasaki | G06F 3/065 726/1 |
| 2009/0193122 A1* | 7/2009 | Krishamurthy | G06F 9/5088 709/226 |
| 2010/0250746 A1* | 9/2010 | Murase | G06F 9/50 709/226 |
| 2010/0325634 A1* | 12/2010 | Ichikawa | G06F 9/4856 718/103 |
| 2011/0119670 A1* | 5/2011 | Sugumar | G06F 9/5088 718/1 |
| 2011/0134761 A1* | 6/2011 | Smith | H04L 43/0852 370/252 |
| 2011/0138384 A1* | 6/2011 | Bozek | H04L 41/0806 718/1 |
| 2011/0161491 A1* | 6/2011 | Sekiguchi | G06F 9/4856 709/224 |
| 2011/0225285 A1* | 9/2011 | Patel | G06F 9/4856 709/224 |
| 2012/0036515 A1* | 2/2012 | Heim | G06F 9/5088 718/105 |
| 2012/0066541 A1 | 3/2012 | Dournov et al. | |
| 2012/0101973 A1* | 4/2012 | Ito | G06F 17/30221 706/50 |
| 2012/0137098 A1* | 5/2012 | Wang | G06F 3/0617 711/165 |
| 2012/0221710 A1* | 8/2012 | Tsirkin | G06F 9/5077 709/224 |
| 2012/0221744 A1* | 8/2012 | Heywood | G06F 9/4862 709/247 |
| 2012/0259814 A1* | 10/2012 | Sasaki | G06F 3/065 707/645 |
| 2012/0278512 A1* | 11/2012 | Alatorre | G06F 3/0605 710/33 |
| 2012/0311603 A1* | 12/2012 | Kudo | G06F 3/0611 718/105 |
| 2013/0054813 A1* | 2/2013 | Bercovici | G06F 9/4856 709/226 |
| 2013/0085998 A1* | 4/2013 | Barker | G06F 9/5088 707/649 |
| 2013/0086272 A1* | 4/2013 | Chen | G06F 9/4856 709/226 |
| 2013/0151683 A1 | 6/2013 | Jain et al. | |
| 2013/0185721 A1* | 7/2013 | Ikegami | G06F 9/45558 718/1 |
| 2013/0304925 A1 | 11/2013 | Ferris et al. | |
| 2013/0311628 A1 | 11/2013 | Kruglick | |
| 2013/0346572 A1* | 12/2013 | Jain | G06F 9/5088 709/223 |
| 2014/0115162 A1* | 4/2014 | Kalyanaraman | H04L 29/08954 709/226 |
| 2014/0208049 A1* | 7/2014 | Furusawa | G06F 3/0647 711/162 |
| 2014/0215060 A1* | 7/2014 | Mo | G06F 11/1402 709/224 |
| 2014/0359058 A1* | 12/2014 | Karnawat | H04L 67/1097 709/217 |
| 2015/0052282 A1* | 2/2015 | Dong | G06F 13/32 710/308 |
| 2015/0095485 A1* | 4/2015 | Alatorre | H04L 47/125 709/224 |
| 2015/0178014 A1* | 6/2015 | Nelson | G06F 3/0647 711/114 |
| 2015/0212840 A1 | 7/2015 | Biran et al. | |
| 2015/0236977 A1* | 8/2015 | Terayama | H04L 47/762 709/224 |
| 2015/0248305 A1 | 9/2015 | Shu et al. | |
| 2015/0331715 A1* | 11/2015 | Sathyanarayana | H04L 67/10 709/226 |
| 2015/0331857 A1* | 11/2015 | Bhatia | G06F 17/303 707/809 |
| 2015/0339156 A1* | 11/2015 | Vincent | G06F 9/4856 718/1 |
| 2015/0356078 A1* | 12/2015 | Kishimoto | G06F 17/30079 707/610 |
| 2016/0007210 A1 | 1/2016 | Batteram et al. | |
| 2016/0029769 A1 | 2/2016 | Park et al. | |
| 2016/0124735 A1 | 5/2016 | Dingsor et al. | |
| 2016/0154660 A1 | 6/2016 | Clark et al. | |
| 2016/0269313 A1* | 9/2016 | Brooker | G06F 9/5072 |
| 2016/0359746 A1* | 12/2016 | Obst | H04L 47/10 |
| 2016/0359953 A1* | 12/2016 | Lervik | H04L 67/10 |
| 2016/0378520 A1* | 12/2016 | Dow | G06F 9/45558 718/1 |
| 2017/0272962 A1* | 9/2017 | Lu | H04W 24/02 |

FOREIGN PATENT DOCUMENTS

| | | |
|---|---|---|
| KR | 10-2011-0034666 | 4/2011 |
| WO | 2010016104 | 11/2010 |
| WO | 2014073024 | 5/2014 |

OTHER PUBLICATIONS

U.S. Appl. No. 13/903,670, filed May 28, 2013, James Christopher Sorenson, et al.

U.S. Appl. No. 14/642,445, filed Mar. 9, 2015, Marc John Brooker.

U.S. Appl. No. 14/643,479, filed Mar. 10, 2015, Christopher Magee Greenwood.

Office Action from Korean Application No. 10-2017-7024942, dated Jun. 14, 2018 (English Translation and Korean version), pp. 1-14.

Examination Report from Application No. 2016229135, (Amazon Technologies Inc.), dated Nov. 23, 2018, pp. 1-4.

Rochman et al., "Efficient Resource Placement in Cloud Computing and Network Applications", 2013, pp. 1-30.

Rochman et al., "Resource Placement and Assignment in Distributed Network Topologies", 2013, pp. 1-13.

* cited by examiner

NETWORK LOCALITY-BASED THROTTLING FOR AUTOMATED RESOURCE MIGRATION

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

Figure 1:
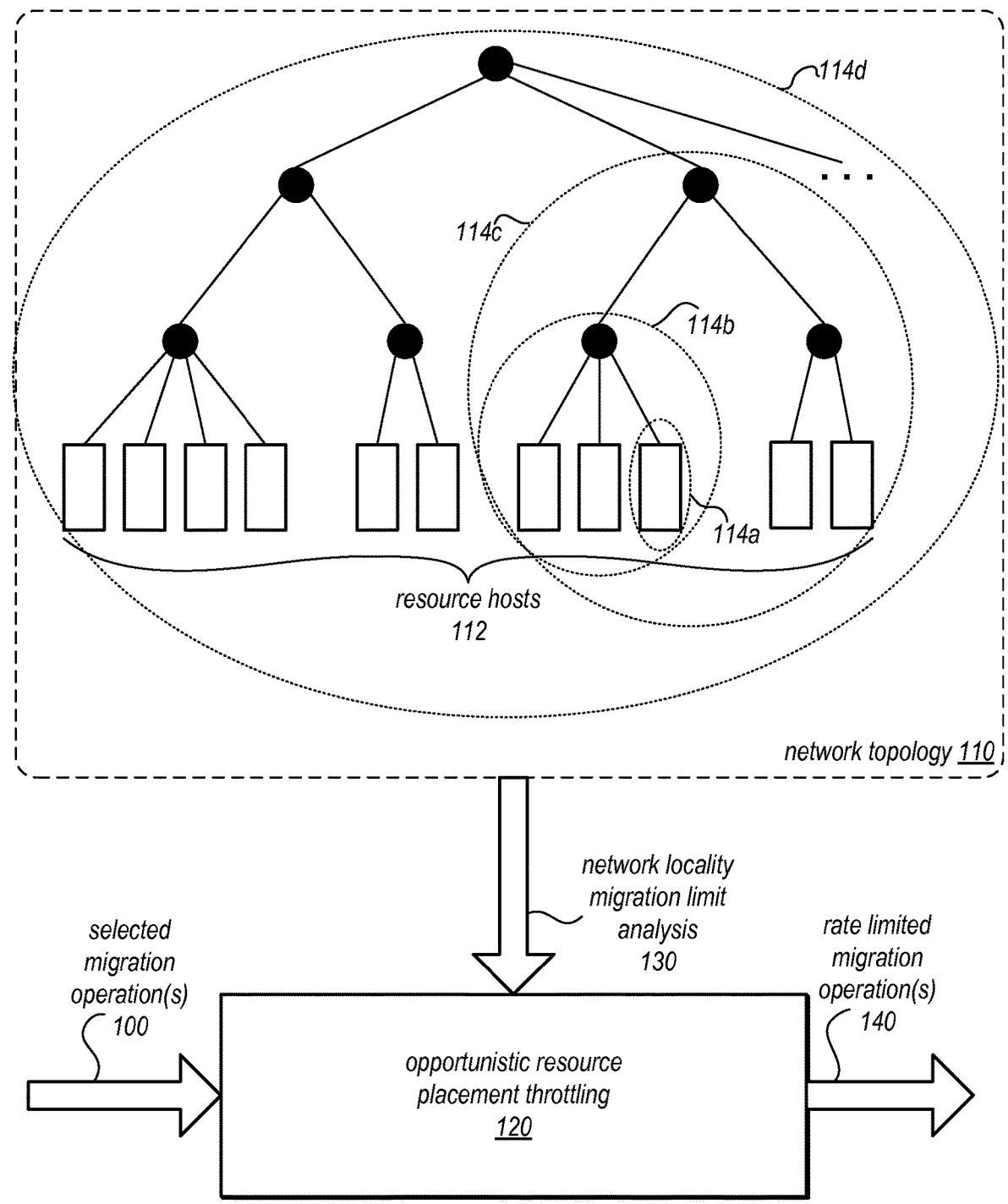
FIG. 1 illustrates a logical block diagram for network locality-based throttling for automatic resource migration, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement network locality-based throttling for automatic resource migration. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made to locate the resources at different resource hosts during creation. However, waiting to place resources until an optimal location is available may be difficult, as resources may need to be placed in order to begin operation. Instead, initial placements of resources at resource hosts may be made according to the best available placement. Over time sub-optimal placements (even if the placements were the best location for a resource at the time of initial placement) may add up to significant costs, such as underutilized resource hosts, inefficient or less durable configurations for distributed resources, and/or various other kinds of waste or inefficiency for the resource or distributed system as a whole Placement decisions may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource with which the placed resource communicates). Placement criteria may include, but are not limited to, a configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations.

Automated, dynamic, or opportunistic resource migrations may be made to improve placement of resources in a distributed system, migrating currently placed resources from one location to another. Resource migrations, however, impact the performance of a distributed system. Network costs, processing costs, storage costs, or any other computing resource costs may be incurred as a result of resource migrations. Without considering the impact of resource migrations upon a distributed system, automated resource migrations may overwhelm, disrupt, or cause failures in the distributed system. Network-locality-based throttling for automatic resource migration may be implemented to better control and distribute automatic resource migration operation to reduce or distribute the costs/impact of migration.

FIG. 1 illustrates a logical block diagram for network locality-based throttling for automatic resource migration, according to some embodiments. Resource hosts 112 may maintain different resources for a distributed system. Resource hosts 112, which may be one or more computing systems, nodes, or devices (e.g., system 1000 in FIG. 9 below) may be configured to host or implement a resource of the distributed system. Migration operation(s) 100 may be selected to improve placement of individual resources, or for placement of resources among the distributed system as a whole. Automated performance (or manual performance) of these migration operations may impact the distributed system. A network locality migration limit analysis 130 may be performed to determine the impact of migration operations upon network localities, allowing resource migration throttling 120 to direct limited migration operation(s) 140.

Network localities may be points or portions of a network topology for a distributed system. In at least some embodiments, network localities may be arranged in a hierarchical fashion, such as a tree. A network locality that is higher in the hierarchy of the network localities may encompass other network localities that are lower in the hierarchy. For instance, network locality 114c may include lower network localities including 114b and 114a. For network communications to reach certain resource hosts one or multiple different network localities may be traversed. Current resource migration may be determined by collecting, tracking, and/or recording performance characteristics associated with different network localities. For network localities that are routers, switches, and/or other communication devices, performance characteristics may current network utilization at the network locality (e.g., number of data packets transmitted) and available bandwidth, number of requests, and/or number of ongoing resource migration operations. For network localities that are resource hosts, additional information about the resource host may be collected, such as disk utilization, processor utilization, and/or any other workload measures, along with information about resource(s) hosted at a resource host. Environmental measures or characteristics for the resource hosts, rooms, or data center sites may be tracked or collected, such as various temperature measurements which may indicate increases in power consumption to provide cooling or other environmental controls or time of day which may indicate resource use or workload (e.g., data backups at night). In at least some embodiments, network localities may be used to evaluate logical groupings of resources or resource hosts. For instance, if migration limiting is to be performed upon resources associated with a particular user account, a network locality that encompasses the resources associated with the user account may be evaluated with respect to the migration limit (e.g., no more than 5 resource migrations for a user account may be performed at a time).

As illustrated in FIG. 1, network localities 114 may be affected by migrating a resource from or to resource host 114a. For example, network locality 114d may be a global network locality, in which all migration operations perform. Migration operations may be limited for global network locality 114d, so a determination of the performance of a migration operation may be made with respect to a global migration operation threshold. Other localities may have similar or different migration operation thresholds, such as network locality 114c and 114b (which may be routers, switches, or other network communication devices). For example, as illustrated in FIG. 1, network locality 114b may include three resource hosts 112. A migration limit for the locality 114b may include a limitation on the number of migration operations performed between any two resource hosts 112 at a time. Resource 114a may be a network locality, and a similar determination with respect to a migration operation limit may be made for resource host 114a. Migration operation limits may compare a number of migration operations ongoing in a network locality to a threshold number of migration operations, network utilization of a network locality to a threshold network utilization, or any other resource utilization to a resource utilization threshold. In some embodiments, a global shutdown of migration operations may be performed by modifying a global migration operation threshold to zero. Similarly, individual network localities, such as migration operations for network locality 114c may have subsequent migration operations blocked.

Please note that previous descriptions are not intended to be limiting, but are merely provided as an example of network locality-based throttling for automatic resource migration. Various components may perform resource throttling. Different numbers or types of resources and network topology may be employed.

This specification begins with a general description of a provider network, which may implement network locality-based throttling for automatic resource migration offered via one or more network-based services in the provider network, such as opportunistic migration for data volumes offered via a block-based storage service. Then various examples of a block-based storage service are discussed, including different components/modules, or arrangements of components/module that may be employed as part of volume placement for data volumes in the block-based storage service. A number of different methods and techniques to implement network locality-based throttling for automatic resource migration are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
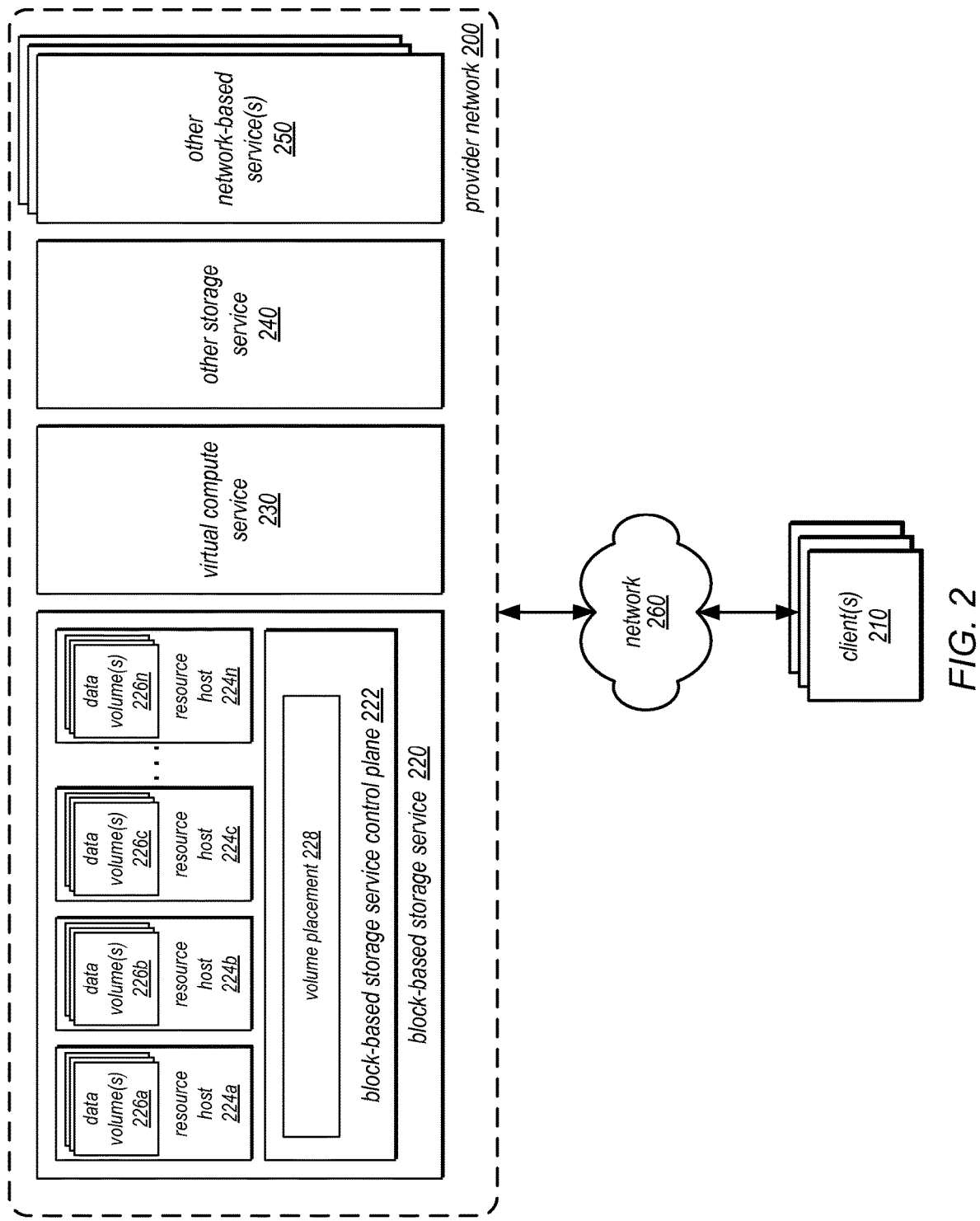
FIG. 2 is a block diagram illustrating a provider network that includes multiple network-based services such as a block-based storage service that implements network locality-based throttling for automatic resource migration, according to some embodiments.

FIG. 2 is a block diagram illustrating a provider network implementing multiple network-based services including a block-based storage service that implements network locality-based throttling for automatic resource migrations, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n (e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
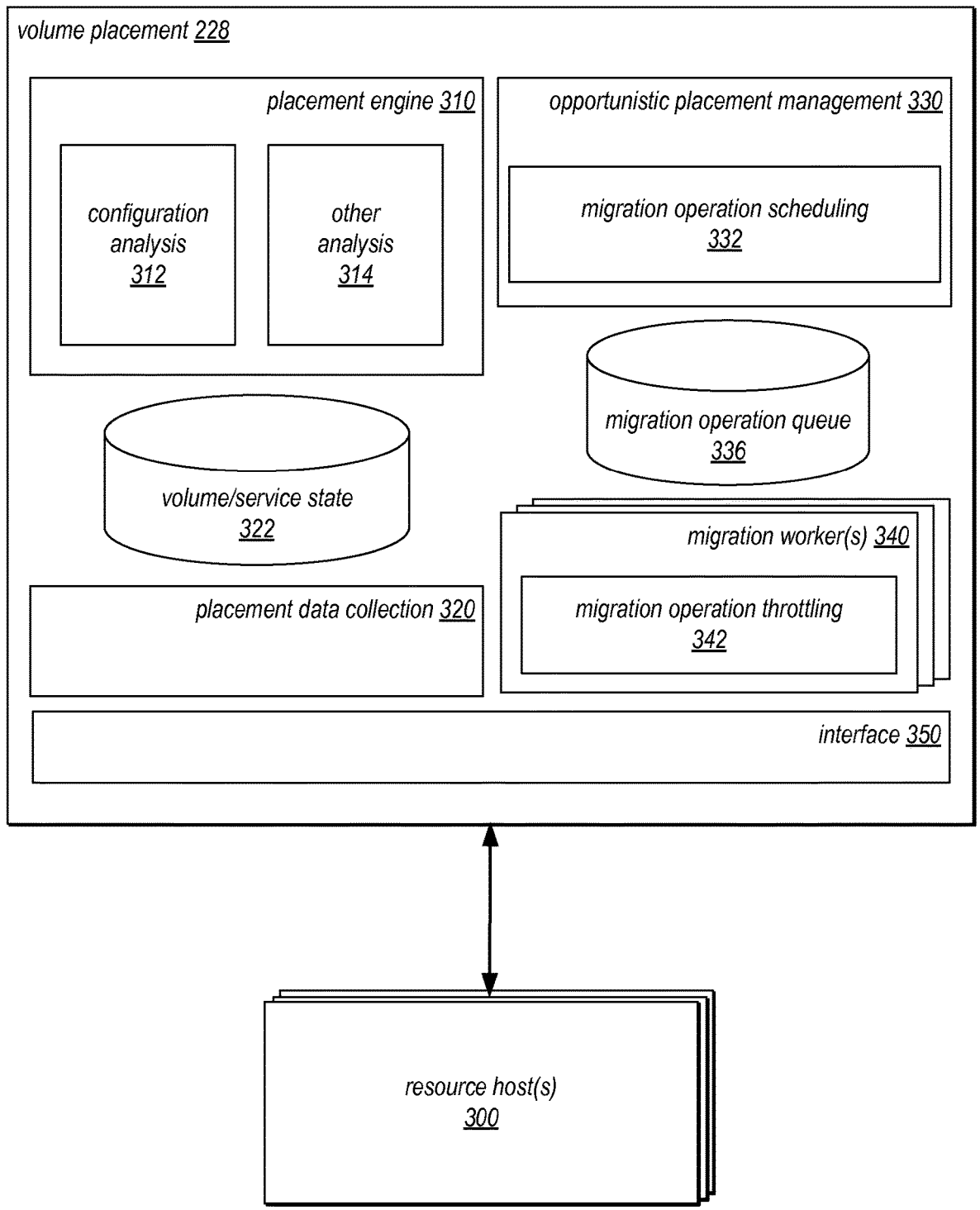
FIG. 3 is a logical block diagram illustrating volume placement that implements network locality-based throttling for automatic resource migration, according to some embodiments.

FIG. 3 is a logical block diagram illustrating volume placement that implements opportunistic resource migration to optimize resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 10). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 10). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure zones, partitions, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes. Analysis may be performed with respect to the placement criteria, discussed above, to determine placement locations which may be optimal for individual resources, or for the block-based storage service as a whole. For instance, placement engine 310 may implement configuration analysis 312 to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Configuration analysis 312 may consider the impact of migrating currently placed resources to other resource hosts in order to free up space at resource hosts that would provide better configurations for other resources of a distributed resource (e.g., move a slave volume to another host to make room for a different slave volume at the host which would be in the same infrastructure zone as a master of the volume or a client of the volume).

In response to receiving a placement request at placement engine 310, configuration analysis 312 may determine prospective placements by accessing volume/service state 322. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of a distributed, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis 312 upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-slave replica pairs. Configuration analysis 312 may be performed based on the placement configuration for each portion of the data volume that is replicated (e.g., each master-slave replica pair) or all of the data volume partitions (e.g., all 3 of the master-slave replica pairs).

Placement engine 310 may implement other analysis 314 to determine partition placements. For example, scores may be generated for placements based on the last time a particular resource host was contacted or heard from. Analysis may be performed to identify and prevent multiple master-slave replica pairs from being placed on the same two resource hosts. In some embodiments, resource host fragmentation analysis may be performed, to optimize placement of resources on resource hosts that can host the partition and leave the least amount of space underutilized. As with configuration analysis above, the example analysis given above may be performed to determine placement locations for some resources which if migrated would may provide better placement of other resources that were not moved.

In some embodiments, volume placement 228 may implement opportunistic placement manager 330. Opportunistic placement management 330 may dynamically or proactively migrate currently placed resources (e.g., volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource). Opportunistic placement management is generally described in U.S. application Ser. No. 14/642,445, entitled "OPPORTUNISTIC RESOURCE MIGRATION TO OPTIMIZE RESOURCE PLACEMENT," filed Mar. 9, 2015, which is incorporated herein by reference in its entirety. Opportunistic placement manager 330 may implement migration operation scheduling 332 to request placements for resources from placement engine 310 that are determined to be placed sub-optimally (e.g., a lower scoring infrastructure zone category), such as discussed below with regard to FIGS. 6 and 7. Migration operation scheduling 332 may then determine which placements if performed would exceed a migration optimization threshold (e.g., a difference between a current placement score and new placement score). For those resources with possible placements that would exceed the placement optimization threshold, migration operation scheduling 332 may place a migration operation for the partition in migration operation queue 336. In some embodiments, migration operation scheduling 332 may assign a priority to migration operations, so that more beneficial migration operations are performed sooner.

Figure 4:
FIG. 4 is a logical block diagram illustrating a migration queue for optimistic resource migration, according to some embodiments.

The performance of migration operations to migrate resources from one resource host to another may be asynchronous. To coordinate the scheduling and/or performing of different migration operations, a scheduling structure or other data set may be maintained. In some embodiments, a queue of migration operations, such as migration operations queue 336 may be implemented. FIG. 4 is a logical block diagram illustrating a migration queue for optimistic resource migration, according to some embodiments.

Migration operation queue 400 may be maintained in persistent storage, such as distributed or centralized data store. In at least some embodiments, a database system or other storage system that provides transaction controls may be utilized to maintain migration operation queue. For example, migration operation queue 400 may be maintained as a database table in another network-based service, such as a NoSQL data store implemented as part of other storage service 240. Migration operation scheduling 332 may update migration operation queue 400 periodically, according to the various techniques described below with regard to FIGS. 6-9. For example, migration operation 404 may have state changed from "in-progress" to complete. Various metadata and information for a migration operation may be maintained, such as a volume identifier, location of a destination host, state, time of last update, and/or priority value.

Migration operation scheduling 332 may also remove migration operations from queue 400, such as those migration operations identified as complete or failed, (e.g., migration operations 404 and 408. Those migration operations that have not yet been performed may have updated priorities stored in the queue (e.g., raising or lowing the priority value). Time of last update may indicate when an update to the migration operation in the queue was last made. For example, migration operation 502 has a later update time (14:34:06) than other migration operations, 504, 506, and 508, and thus may be considered to have more recent/relevant data. As discussed below with regard to FIG. 7, priority values may be assigned to migration operations in order to schedule the migration operations opportunistically. In at least some embodiments, migration operation queue 400 may be implemented as a priority queue, and thus the highest priority migration operation may be selected for performance.

Turning back to FIG. 3, migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 310, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 310, networking device (s), router(s), switches, power source(s), or other component or device of a virtual block-based storage service may be evaluated with respect to the effect of performing the identified resource migration operation. For instance, total network utilization (or in-bound or out-bound network utilization) for a network locality (e.g., a network router, switch, brick, or resource host, or group thereof) may be determined and compared with a network utilization threshold. Different migration limits (e.g., number of migration operations, network utilization, resource host utilization, etc.) may be enforced with respect to the network localities. If the migration operation exceeds the limit for one of the different network localities, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with performing a migration, such as zones that include the current resource hosts sending or transferring resources and/or destination resource hosts receiving resources as part of migration operations). In some embodiments, opportunistic placement management 330 may perform migration operation throttling in addition to, or in place of migration worker(s) 340.

In various embodiments, migration worker 340 may request an updated placement for a resource that is to be migrated from placement engine 310, which may perform the various techniques discussed above and below to provide a new placement location for the resource.

Figure 5:
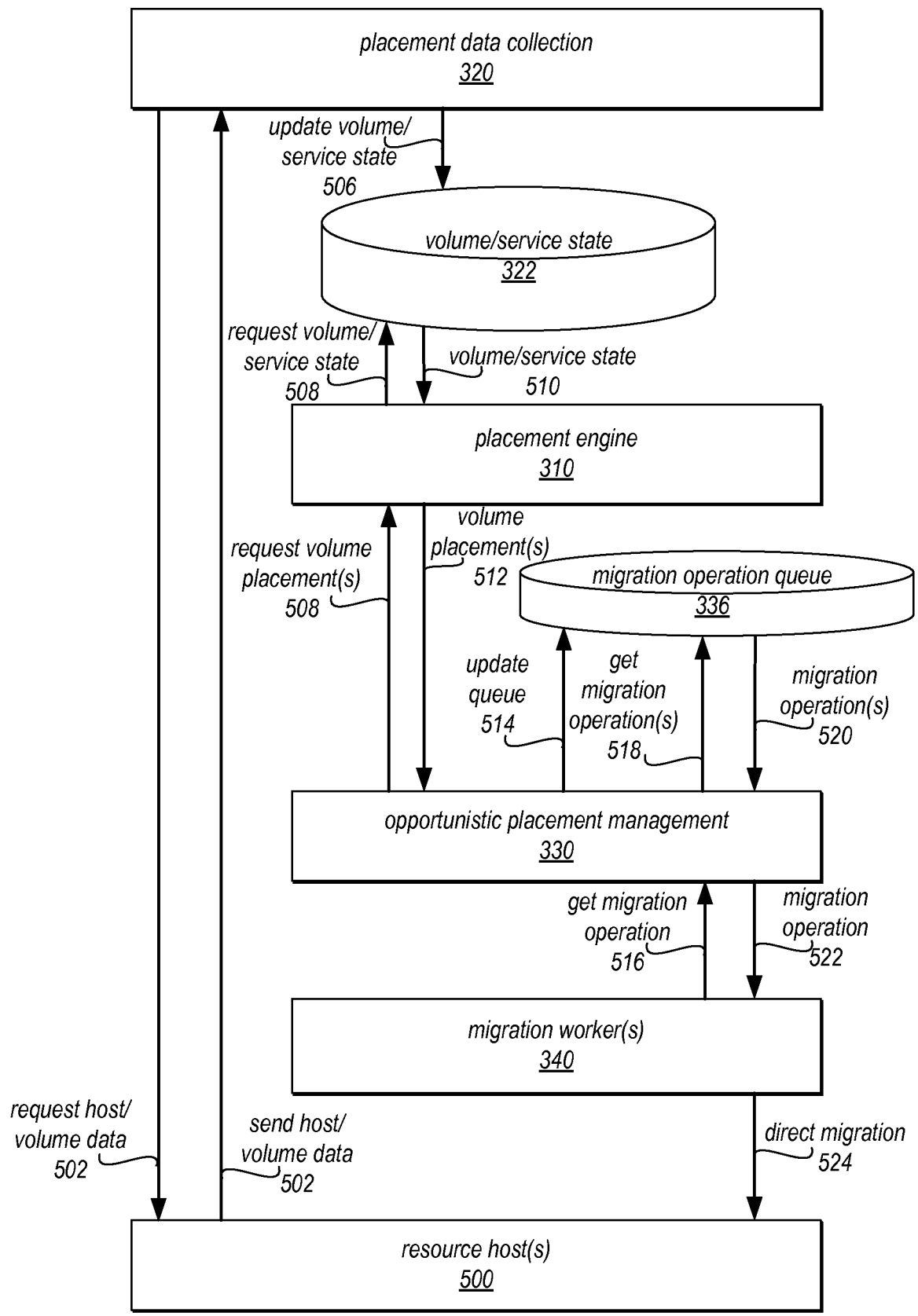
FIG. 5 is a logical block diagram illustrating interactions for opportunistically migrating data volumes in a block-based storage service, according to some embodiments.

FIG. 5 is a logical block diagram illustrating interactions for migrating resources (e.g. replicas of data volumes), according to some embodiments. As discussed above, placement data collection 320 may sweep or request host/volume data 502 from resource host(s) 500 in order to update volume service state 322. Resource host(s) 502 may send host/volume data to placement data collection 320, which may aggregate and/or update volume/service state 506. Opportunistic placement management 330 may request volume placement(s) 508 from placement engine 310. Placement engine 310 may determine placement locations, such as according to the techniques described above with regard to FIG. 3. Volume placement(s) 512 may be provided to opportunistic placement management 330. For those volumes (or resources) that exceed the migration optimization threshold, migration operation queue 514 may be updated to add new migration operations. Stale or completed migration operations may be removed from the migration queue 336.

Migration worker(s) 340 may get migration operations 516 from opportunistic placement manager 330. Opportunistic placement manager 330 may evaluate migration operation queue 336 to get candidate migration operation(s) 518. The migration operation(s) 520 from the migration operation queue 336 may be returned 522 to migration worker(s) 340. Migration worker(s) 340 may then direct the migration operation 524 to affected resource host(s) 500. In some embodiments, migration worker(s) 340 may act as intermediaries, and may obtain the resource from an originating resource host before sending the resource to the destination resource host. The various interactions and illustrations provided in FIG. 5 may be communicated using various standard or customized communication techniques. For example, various internal APIs for placement engine 310, opportunistic placement management 330, migration operation queue 336, volume service state 322, resource host(s) 500, etc., may each have respective interfaces (e.g., programmatic interfaces such as an API), and the respective communications in FIG. 5 may be formatted accordingly.

Figure 6:
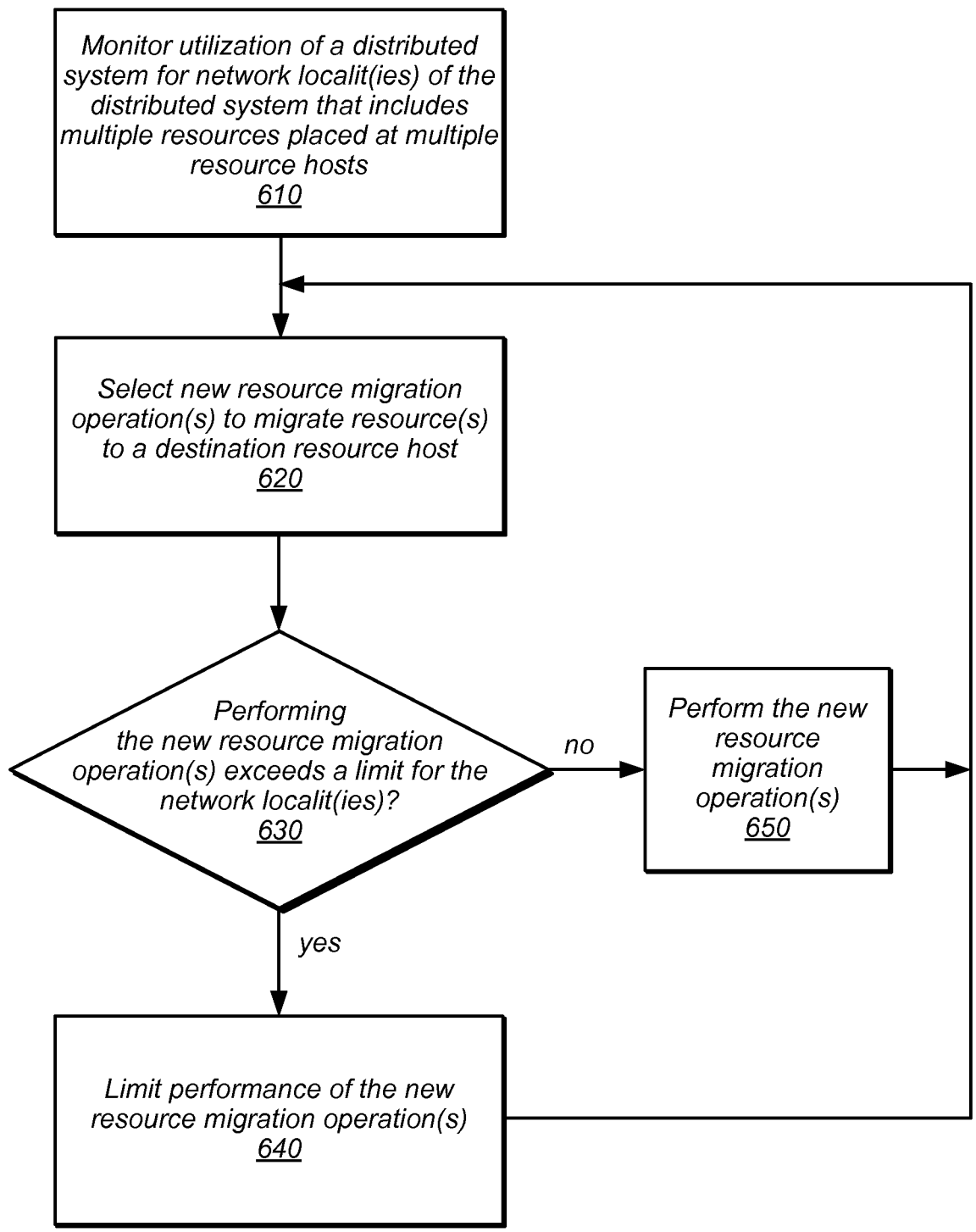
FIG. 6 is a high-level flowchart illustrating various methods and techniques for network locality-based throttling for automatic resource migration, according to some embodiments.

The examples of locality-based throttling for resource migration discussed above with regard to FIGS. 2-5 have been given in regard to a block-based storage service and/or other network-based services. Various other types or configurations of distributed systems placing resources of distributed resources at resource hosts may implement these techniques. Different configurations of the various modules, components, systems, and or services described above that may implement network locality-based throttling may be configured to throttle migration operations for resources. FIG. 6 is a high-level flowchart illustrating various methods and techniques for network locality-based throttling for automatic resource migration, according to some embodiments. These techniques may be implemented using a control plane, opportunistic placement manager or other component for placing resources at currently placed at other resource hosts in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master replica and one or more replica slaves. Initial placement of resources at resource hosts may be performed when optimal placement locations are not available. Automatically migrating volumes to better locations may improve distributed system performance, individual resource performance, or distributed system performance according to various design goals, guarantees, or other desirable attributes for resources in the distributed system. Migration operations are not without impact upon the distributed system. Throttling for automatic resource migrations may be implemented to better distribute migration operations across a distributed system, lessening the cost or impact of automatic migration upon other distributed system operations.

As indicated at 610, utilization of a distributed system for network localit(ies) may be monitored at the distributed system that includes multiple resources placed at multiple resource hosts. Network localities may be points or portions of a network topology for a distributed system and may include respective systems, components, or devices located within the network localities. In at least some embodiments, network localities may be arranged in a hierarchical fashion, such as a tree. For network communications to reach certain resource hosts one or multiple different network localities may be traversed.

Current resource migration may be determined by collecting, tracking, and/or recording utilization and performance characteristics associated with different network localities. For network localities that are routers, switches, and/or other communication devices, performance characteristics may be current network utilization at or within the network locality (e.g., number of data packets transmitted) and available bandwidth, number of requests, and/or number of ongoing resource migration operations. For network localities that are resource hosts, additional information about the resource host may be collected, such as disk utilization, processor utilization, and/or any other workload measures. As discussed above, sweeps of requests for data may be sent out to resource hosts and other systems or devices in the distributed system for the network localities (e.g., routers, switches, etc.). In some embodiments, the data may be reported to a centralized location (e.g., volume/service state 322 in FIG. 3).

As indicated at 620, new resource migration operations may be selected to migrate resource host(s). For instance, a migration operation queue or other data structure that identifies potential migration operations to be performed may be evaluated, as discussed above with regard to FIG. 4 and below with regard to FIG. 7, to determine a migration operation to perform. In some embodiments, new migration operations may be identified at the time of or in response to a request to perform a migration operation (e.g., a request from a migration worker). Migration operations can be prioritized, which may effectively throttle or limit the performance of some migration operations, in some embodiments. Consider the example where migration operation priority scores are assigned to migration operations and periodically updated based on collected or updated utilization data for the distributed system. The priority scoring of migration operations may be indicative of the capability of affected network localities involved in a migration operation of a resource to perform or participate in the migration operation. Priority scores for migration operations, for instance, could be lowered for migration operations that would be included in network localities exceeding or near exceeding migration operation thresholds. Priority scoring may also be implemented to provide a cost-benefit consideration for throttling or limiting the performance of migration operations. Changing priority values for a migration operation may indicate that a once beneficial migration operation, for example, is no longer as beneficial, or even detrimental. Migration operations that do not exceed some improvement threshold may be throttled (or blocked altogether).

As indicated at 630, in various embodiments a determination may be made as to whether performing the new resource migration operation(s) exceeds a migration limit for network localities. For example, a migration operation may impact multiple network localities, from a global network locality to the resource host from which the migration is being migrated or the destination host to which the resource is bound. Affected network localities may be identified for a migration operation, and separate determinations may be made for each network locality. For example, the effect of performing the new migration operations may be determined upon a global network locality compared to a global migration operation limit. Other network localities, such as various network bricks or routers that may be affected may have similar determinations made with respect to their own migration operation limits (which may be different from the global operation limit). A determination may also be made with respect to the effect of performing the migration operations on a resource host compared to a migration operation limit for the resource host. In at least some embodiments, if any one of the identified network locality migration operation thresholds is exceeded then, as indicated at 640, the performance of the new migration operations may be throttled. If no network locality migration operation threshold is exceeded, then the new migration operations may be performed.

Migration operation limits may be implemented in many ways. In some embodiments, the number of current migration operations including the new migration operations may be compared with a number limit of migration operations for the network locality. Current network utilization may be determined in some embodiments, such as by calculating a current network utilization including the performance of the new migration operations and comparing the current network utilization with respect to a network utilization limit for a network locality. Some determinations may be specific to the network locality. For instance, utilization of resources at a resource host (e.g., processing resources, I/O resources, storage resources, heat/cold, time of day, etc.) may be evaluated for a network host, while a number of current or ongoing migration operations may be evaluated for a global network locality. Migration operation limits may be associated with the logical groups of resources or resources hosts in a network locality (e.g., migration limits for resources associated with a particular user account). In some embodiments, multiple migration limits may be implemented for a network locality.

Throttling performance of migration operations may be performed to delay (or halt) performance of the new migration operations. Performance of the new migration operations may not begin until performance may occur without exceeding migration operation limits. For example, in some embodiments, migration operations are selected from a migration operation queue (as discussed above with regard to FIGS. 3-5). If it is determined that a selected migration operation exceeds a network locality migration operation threshold, then the migration operation may be removed from the migration queue, for instance, so that it is not always evaluated every time a determination of a migration operation to perform is made. A subsequent prioritization sweep, such as discussed above with regard to FIGS. 3-5 may insert the removed migration operations back into the migration queue at a later time, at which they may be performed (if no migration operation limit is exceeded). Please note that various other throttling mechanisms may be performed. For example, alternative destination hosts may be determined in some embodiments, allowing a migration operation to proceed that does not violate migration operation limits. Various lists, queues, or other data structures may be maintained to store throttled migration operations until they can be performed.

Figure 7:
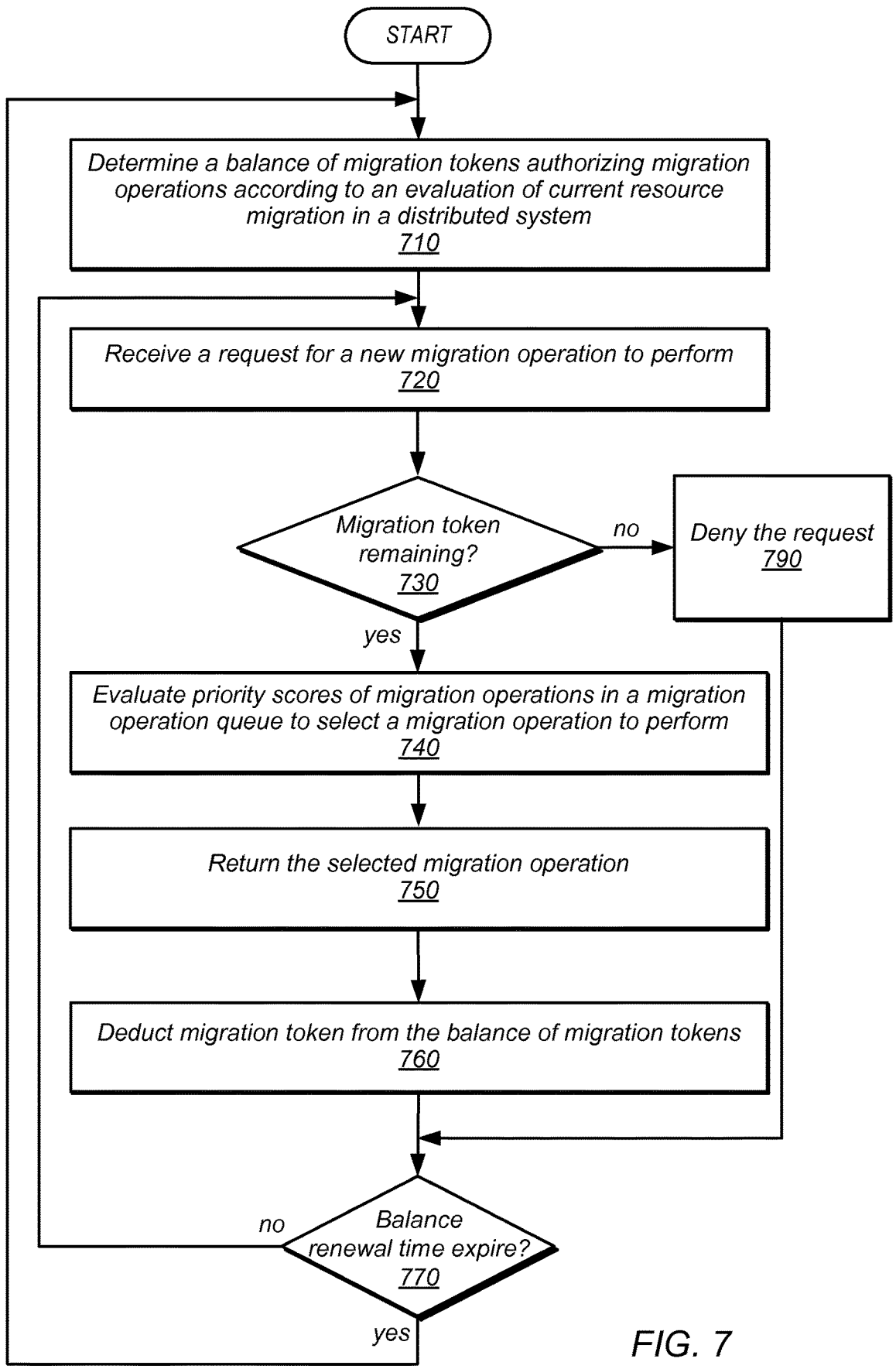
FIG. 7 is a high-level flowchart illustrating various methods and techniques for throttling migration operations, according to some embodiments.

As noted above, different techniques may be implemented to throttle migration operations at network localities. Migration operations may be randomly (or intelligently) dropped or aborted. In some embodiments, throttling may be implemented to control the number of migration operations being performed at a network locality. FIG. 7 is a high-level flowchart illustrating various methods and techniques for throttling migration operations, according to some embodiments.

As indicated at 710, a balance of migration tokens authorizing migration operations may be determined according to an evaluation of current resource migration in a distributed system. For example, the number of current migration operations may be counted for network localit(ies). The number of current migration operations may be subtracted from the migration operation limit defined as a total or ongoing number of migration operations. The difference (if greater than 0) may be the number of migration tokens determined in the balance of migration tokens.

As indicated at 720, a request for a new migration operation to perform may be received, in some embodiments. Migration workers for instance, such as migration worker(s) 340 in FIG. 3 may send a request to perform a migration operation, as illustrated in FIG. 5. If a migration token remains in the balance of migration tokens, as indicated by the positive exit from 730, then a migration operation may be returned from a migration queue (e.g., migration queue 400 in FIG. 4) or other migration operation schedule to perform, as indicated at 750. For instance, as indicated at 740, an evaluation of priority scores of migration operations in a migration operation queue may be performed to select the migration operation to return. Priority scores, as discussed above with regard to FIGS. 3, 4, and 6, may be indicative of the next migration operation to perform. Changing priority scores may impact and/or effectively limit the performance of those migration operations with a lower priority. For example, the priority score may be indicative of distributed system improvement obtained as a result of performing the migration operation (e.g., the difference between a placement score of a resource in its current location and a potential destination location). This improvement may be compared to some threshold, which if exceeded, may allow for the migration operation to be selected for performance. If, however, the improvement fails to exceed the threshold, the migration operation may remain unselected until such a time when the priority is updated to increase the improvement obtained by the migration operation, or the migration operation is removed from consideration (e.g., removed from the queue).

A migration token may be deducted from the balance of migration tokens, as indicated at 760. If no migration token remains when a request for a migration operation is received, as indicated by the negative exit from 730, then the request for the migration operation may be denied, as indicated at 790. As indicated by the positive exit from 770, after a period of time, balance renewal may occur, allowing a new balance of migration token determination to be made. Some migration operations may complete (or fail) during the balance renewal time period. In this way the balance of migration tokens may be replenished as the count of currently performing migration operations decreases due to failures or completions of migration operations. The techniques discussed above with regard to FIG. 7 may be performed for multiple different network localities. Alternatively the technique may be performed for a single network locality (e.g., a global network locality) or a subset of network localities (e.g., particular network routers or hosts), while other throttling techniques may be performed for different network localities.

In some embodiments, migration operation limits may be adjustable, modifiable, or differently enforced for the same network locality in some scenarios. For example, resource consumption during certain environmental conditions of a distributed system may allow for greater or less migration operations to be performed than during other environmental conditions. In some embodiments, an environmental condition for a network locality may be detected. An environmental condition may be a time of day, humidity change, temperature change, or any other change to an environmental factor that may affect the performance of migration operations. In response to detecting the environmental condition, the migration operation limit for the network locality may be modified. For instance, more migration operations may be allowed or less, depending upon the impact of the environmental condition. Consider the scenario where the temperature decreases for a network locality that is a particular data center. As power resources utilized to cool the data center are decreased, power consumed to perform migration operations may be increased, allowing more migration operations to be performed.

Adjustments to migration operation limits may also be made based upon machine learning and/or other data analysis techniques. Historic performance data or utilization of resources, users, clients, resource hosts, networking devices, or any other infrastructure unit may be evaluated to identify common features, triggers, or other indications of changing capabilities to perform migration operations (e.g., more or less) at different network localities. Workload predictions, for instance, determined based on past resource utilization for resource hosts may indicate that an environmental condition, such as time of day, may impact the number of migration operations that can be performed (e.g., reduced resource utilization at night may indicate that more migration operations may be performed at night). In this way, adjustments to migration operation limits may be performed automatically or dynamically according to changing conditions, in various embodiments. For instance, as discussed below, migration operation limitations may include performing a migration operation shutdown, which may be triggered by one of the various environmental conditions or recognized workload predictions discussed above.

Figure 8:
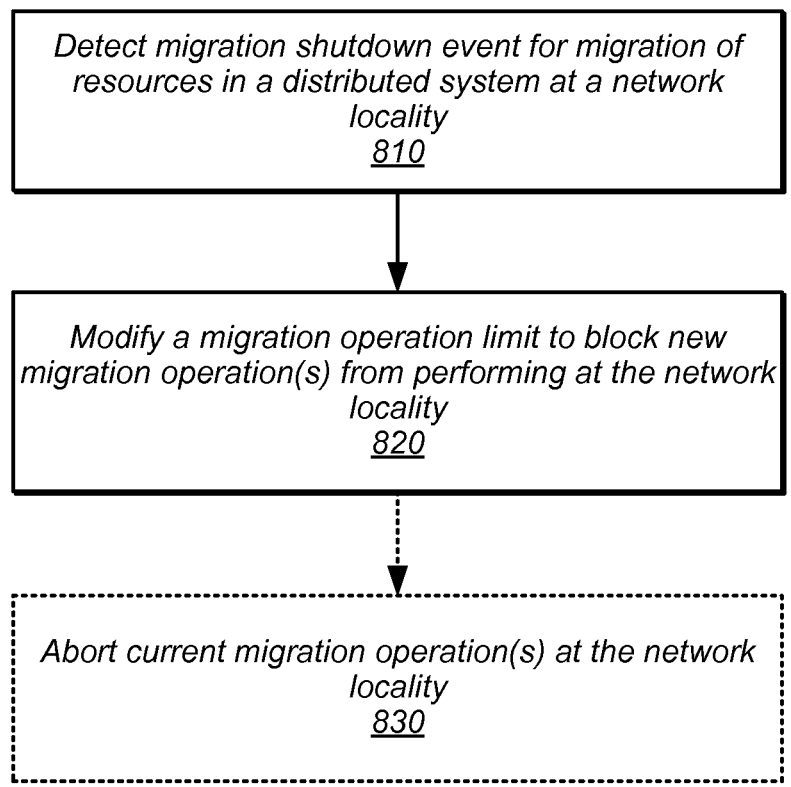
FIG. 8 is a high-level flowchart illustrating various methods and techniques for performing a shutdown of migration operations, according to some embodiments.

Some modifications to migration operation limits may be made to halt or block future migration operations for a network locality. For instance, if a network router fails, then migration operations may be shutdown with respect to resource hosts located behind or otherwise connected to the resource router. FIG. 8 is a high-level flowchart illustrating various methods and techniques for performing a shutdown of migration operations, according to some embodiments.

As indicated at 810, a migration shutdown event for migration of resources in a distributed system may be detected. The shutdown event may be detected for individual network localities (e.g., routers, switches, network spines, resource hosts, etc.) up to a global network locality for a distributed system. Migration shutdown events may be detected in many ways. For instance, in some embodiments, a migration shutdown event may be manually triggered. A request may be received via a programmatic or graphical interface to shutdown migration operations with respect to a particular network locality (e.g., global, router identifier, or resource host). Migration shutdown events may be automatically or dynamically detected, in some embodiments. Various performance or health measures of the distributed system, either globally, or with respect to individual network localities (e.g., network utilization, number of migration operations or placement operations being performed, or communication failures), may be taken, for example. If one or more of the health measures fails with respect to a health threshold, then a shutdown event for the network locality may be triggered.

As indicated at 820, in response to detecting a shutdown event, modify a migration operation limit to block subsequent migration operations at the network locality. For example, a token balance used to determine the number of allowed migration operations, as discussed above with regard to FIG. 7, may be set to 0. In some embodiments, a placement engine or other system or device that determines destination resource hosts may be notified of blocked migration operations for the network locality so that placement requests are not directed to an affected network locality. A migration manager or other system or device may implement a black list or other data set which describes affected network localities under shutdown so that migration operations are not selected or scheduled for resources currently hosted in the affected network localities. Migration operation shutdown may allow a distributed system to dynamically react to changes in performance conditions for which eliminating an automatic migration technique, like the opportunistic resource migration technique described above, may reduce system workload or burden. For instance, a change in environmental conditions, such as a heating or cooling event impacting power consumption may necessitate reducing overall system power consumption. Migration operation shutdown may be performed to reduce power consumption by the distributed system in order to make power available to other systems.

As indicated at 830, in at least some embodiments, in addition to blocking new migration operations, current migration operation(s) at the network locality may be aborted. For example, an abort instruction may be sent to migration workers, resource hosts, or any other system or device directing, performing, or facilitating current migration operation in the network locality.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 9:
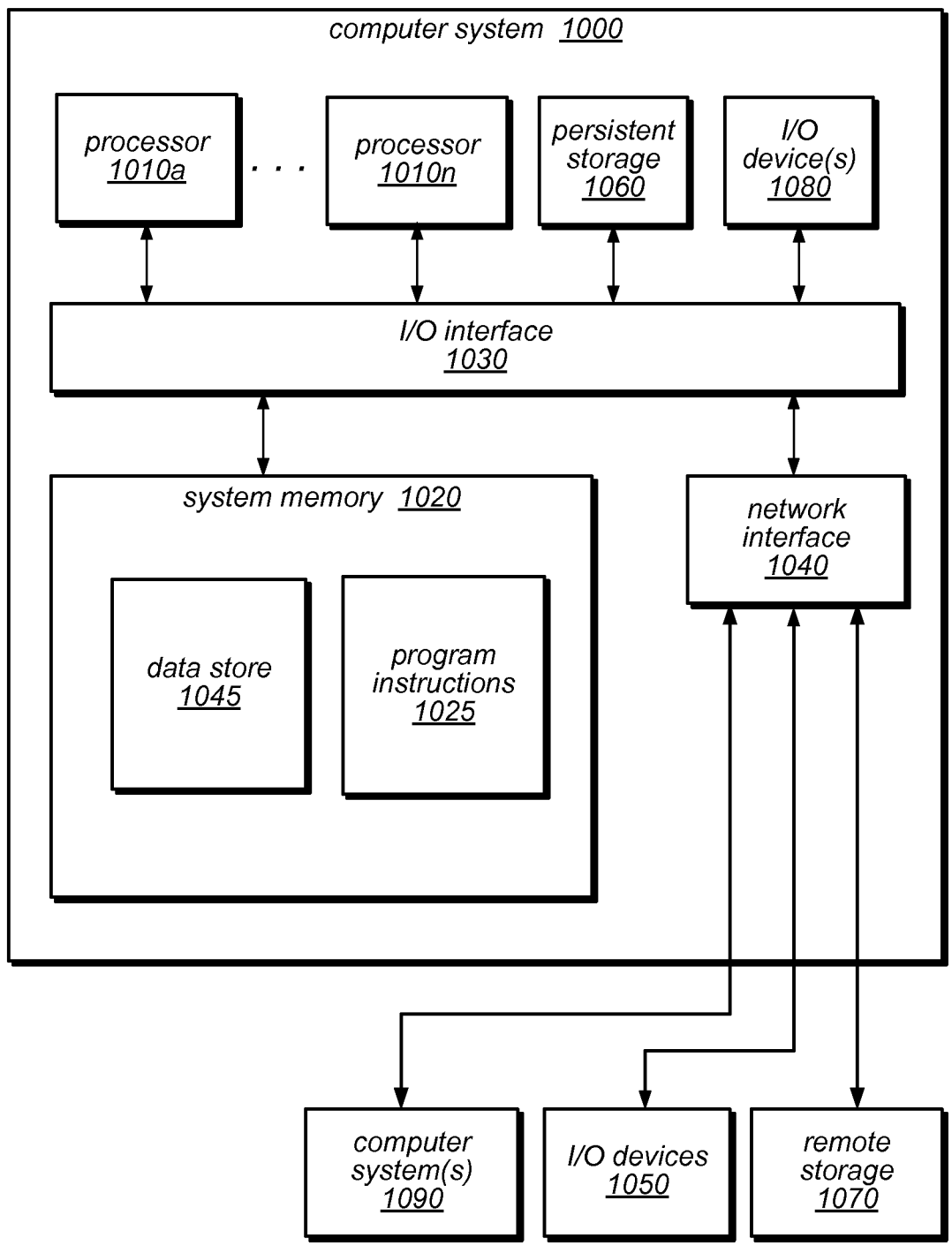
FIG. 9 is a block diagram illustrating an example computing system, according to some embodiments.

Embodiments of network locality-based throttling for automatic resource migration as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of resource hosts, configured to host a plurality of resources;
a migration manager, configured to:
monitor current resource migration operations for one or more network localities of the distributed system, wherein the current resource migration operations comprise migrating respective resources of the plurality of resources from respective current resource hosts of the plurality of resource hosts to respective different resource hosts of the plurality of resource hosts, and wherein to monitor the current resource migration operations the migration manager is configured to track respective utilization characteristics for the current resource migration operations at the one or more network localities;
for one or more new resource migration operations to migrate respective resources of the plurality of resources from respective current resource hosts of the plurality of resource hosts to respective different resource hosts of the plurality of resource hosts:
determine that performing the one or more new resource migration operations, in combination with the tracked utilization characteristics of the monitored current resource migration operations, exceeds a migration operation limit for at least one network locality of the one or more network localities, wherein the migration operation limit comprises a threshold for migration operations at the network locality; and
in response to the determination that performing the one or more new resource migration operations, in combination with the monitored current resource migration operations, exceeds the migration operation limit, delay performance of the one or more new resource migration operations such that the subsequent performance of the one or more new migration operations is below the migration operation limit for the at least one network locality.

2. The system of claim 1, wherein the migration manager is further configured to:
for another one or more new resource migration operations to migrate different respective resources to a different resource host:

determine that performing the other one or more new resource migration operations, in combination with the tracked utilization characteristics of the monitored current resource migration operations, does not exceed a migration operation limit for a different one of the one or more network localities than the at least one network locality; and perform the other one or more migration operations.

3. The system of claim 1, wherein the at least one network locality is a global network locality comprising the one or more network localities of the distributed system such that each migration operation for the distributed system is evaluated with respect to the migration operation limit, and wherein the migration manager is further configured to:

detect a migration shutdown event for the global network locality; and block subsequent migration operations from performance at the distributed system.

4. The system of claim 1, wherein the distributed system is a virtual block-based storage service, wherein the plurality of resources are data volumes maintained in the virtual block-based storage service for a plurality of clients of the virtual block-based storage service.

5. A method, comprising:

performing, by one or more computing devices:

monitoring current resource migration operations for one or more network localities of the distributed system, wherein the current resource migration operations comprise migrating respective resources of the plurality of resources from respective current resource hosts of the plurality of resource hosts to respective different resource hosts of the plurality of resource hosts, and wherein to monitor the current resource migration operations the migration manager is configured to track respective utilization characteristics for the current resource migration operations at the one or more network localities;

for one or more new resource migration operations to migrate respective resources of the plurality of resources from respective current resource hosts of the plurality of resource hosts to respective different resource hosts of the plurality of resource hosts:

determining that performing the one or more new resource migration operations, in combination with the tracked utilization characteristics of the monitored current resource migration operations, exceeds a migration operation limit for at least one network locality of the one or more network localities, wherein the migration operation limit comprises a threshold for migration operations at the network locality; and limiting performance of the one or more new resource migration operations in response to determining that performing the one or more new resource migration operations, in combination with the monitored current resource migration operations, exceeds the migration operation limit for at least one of the one or more network localities.

6. The method of claim 5, further comprising:

for another one or more new resource migration operations to migrate different respective resources to a different resource host:

determining that performing the other one or more new resource migration operations, in combination with the monitored current resource migration operations, does not exceed a migration operation limit for a different one of the one or more network localities than the at least one network locality; and performing the other one or more migration operations.

7. The method of claim 5, wherein determining that performing the one or more new resource migration operations, in combination with the monitored current resource migration operations, exceeds the migration operation limit for the at least one network locality comprises:

based, at least in part, one or more environmental conditions, determining the migration operation limit for the at least one network locality.

8. The method of claim 5, wherein the migration operation limit for the at least one network locality comprises a network utilization limit for the at least one network locality, wherein determining that performing the one or more new resource migration operations exceeds the migration operation limit for the at least one network locality comprises:

determining a network utilization for the at least one network locality that would include the one or more new resource migration operations; and comparing the network utilization with the network utilization limit for the at least one network locality to determine that the network utilization exceeds the network utilization limit.

9. The method of claim 5, wherein the at least one network locality is one of the plurality of resource hosts, wherein the migration operation limit for the at least one network locality comprises one or more resource host utilization limits for the resource host, wherein determining that performing the one or more new resource migration operations, in combination with the monitored current resource migration operations, exceeds the migration operation limit for the at least one network locality comprises:

determining a host utilization for the resource host that would perform the one or more new resource migration operations in combination with the monitored current resource migration operations; and comparing the host utilization with the one or more host utilization limits for the resource host to determine that the host utilization exceeds at least one of the one or more host utilization limits.

10. The method of claim 5, wherein the one or more new resource migration operations are selected for performance from a queue, wherein the queue comprises a plurality of resource migration operations including the one or more new resource migration operations that are placed in the queue based on an evaluation of current placements of the plurality of resources in the distributed system; and wherein throttling performance of the one or more new resource migration operations comprises removing the one or more new resource migration operations from the queue.

11. The method of claim 5, further comprising:

detecting a migration shutdown event for the at least one network locality; and modifying the migration operation limit to block subsequent migration operations from performing at the at least one network locality.

12. The method of claim 11, wherein detecting a migration shutdown event for the distributed system comprises determining that one or more metrics for the distributed system does not meet a health threshold.

13. The method of claim 5, wherein the distributed system is a network-based service, and wherein the plurality of resources are resources maintained at the network-based service for a plurality of clients of the network-based service.

14. A non-transitory, computer-readable storage medium, storing program instructions that when executed by one or more computing devices cause the one or more computing devices to implement:

monitoring current resource migration operations for one or more network localities of the distributed system, wherein the current resource migration operations comprise migrating respective resources of the plurality of resources from respective current resource hosts of the plurality of resource hosts to respective different resource hosts of the plurality of resource hosts, and wherein to monitor the current resource migration operations the migration manager is configured to track respective utilization characteristics for the current resource migration operations at the one or more network localities;

for one or more new resource migration operations to migrate respective resources of the plurality of resources from respective current resource hosts of the plurality of resource hosts to respective different resource hosts of the plurality of resource hosts:

determining that performing the one or more new resource migration operations, in combination with the tracked utilization characteristics of the monitored current resource migration operations, exceeds a migration operation limit for at least one network locality of the one or more network localities, wherein the migration operation limit comprises a threshold for migration operations at the network locality; and limiting performance of the one or more new resource migration operations in response to determining that performing the one or more new resource migration operations exceeds the migration operation limit for at least one of the one or more network localities.

15. The non-transitory, computer-readable storage medium of claim 14, wherein the program instructions cause the one or more computing devices to further implement:

for another one or more new resource migration operations to migrate different respective resources to a different resource host:

determining that performing the other one or more new resource migration operations, in combination with the monitored current resource migration operations, does not exceed a migration operation limit for a different one of the one or more network localities than the at least one network locality; and performing the other one or more migration operations.

16. The non-transitory, computer-readable storage medium of claim 14, wherein, in determining that performing the one or more new resource migration operations, in combination with the tracked utilization characteristics of the monitored current resource migration operations, exceeds the migration operation limit for the at least one network locality, the program instructions cause the one or more computing devices to implement:

determining a number of currently performing migration operations for the at least one network locality that would include the one or more new resource migration operations; and comparing the number of currently performing migration operations with a total migration operations limit for the at least one network locality to determine that the number of currently performing migration operations exceeds the total migration operations limit.

17. The non-transitory, computer-readable storage medium of claim 14, wherein the program instructions cause the one or more computing devices to implement:

detecting an environmental condition for the at least one network locality; and modifying the migration operation limit for the at least one network locality such that subsequent migration operations are limited according to the modified migration operation limit.

18. The non-transitory, computer-readable storage medium of claim 14, wherein the program instructions cause the one or more computing devices to further implement:

detecting a migration shutdown event for the at least one network locality; and modifying the migration operation limit to block subsequent migration operations from performing at the at least one network locality.

19. The non-transitory, computer-readable storage medium of claim 18, wherein, in detecting the migration shutdown event for the at least one network locality, the program instructions cause the one or more computing devices to implement:

receiving a request to block subsequent migration operations for the at least one network locality.

20. The non-transitory, computer-readable storage medium of claim 14, wherein the distributed system is a virtual block-based storage service, wherein the plurality of resources are data volumes maintained in the virtual block-based storage service for a plurality of clients of the virtual block-based storage service.

* * * * *